S. DAVIS.
Lamp.
No. 14,806.
Patented May 6, 1856.
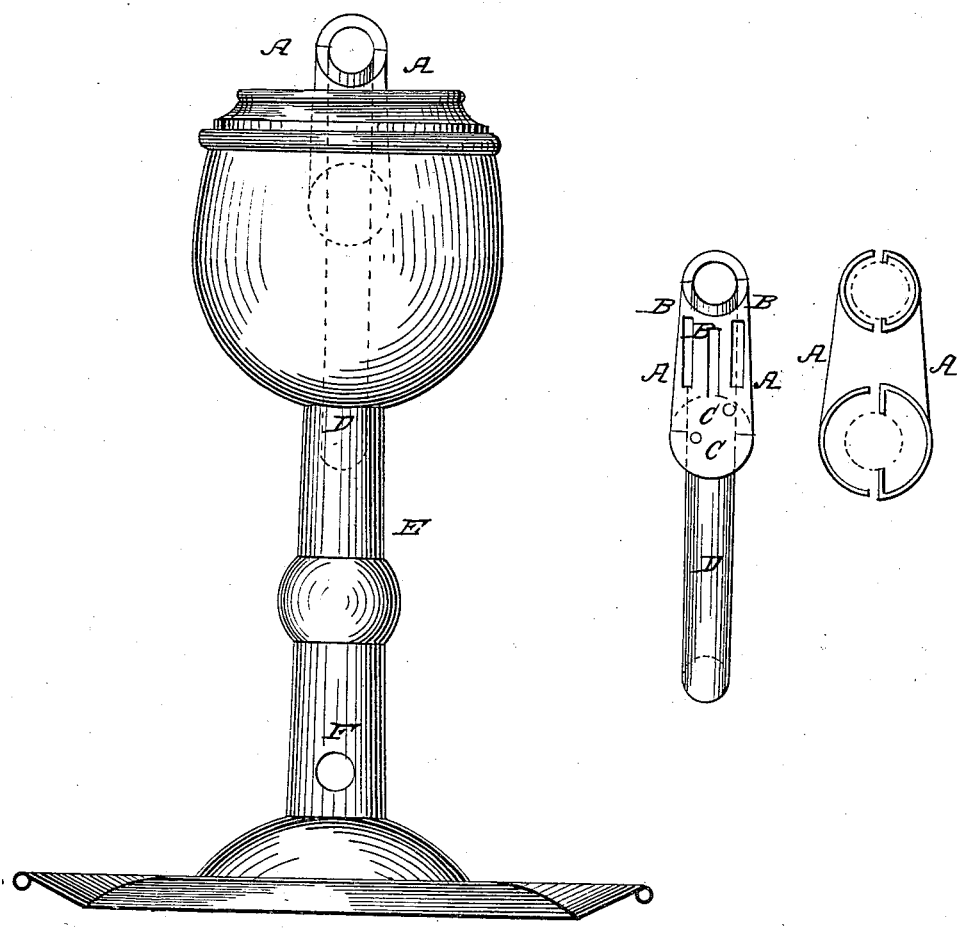

UNITED STATES PATENT OFFICE.

SAMUEL DAVIS, OF NEW HOLLAND, PENNSYLVANIA.

LARD-LAMP.

Specification of Letters Patent No. 14,806, dated May 6, 1856.

*To all whom it may concern:*

Be it known that I, SAMUEL DAVIS, of New Holland, county of Lancaster, and State of Pennsylvania, have invented new and useful Improvements in Lard-Lamps; and I do hereby declare that the following is a full and exact description, reference being had to the annexed drawings, making a part of this specification.

The nature of my invention consists in a divided cone shaped feeder and lard heater to admit of a double wick with its peculiar shaped slots and apertures.

To enable others skilled in the art to make and use my invention I will proceed to describe its construction.

A, A, is a metal cone shaped feeder and lard heater, in two segments with six slots B at top, and four circular apertures C below, and a tube D in and through its center. The tube D extends down into the stem E of the lamp, and is soldered fast to the bottom of the globe of the lamp before the stem E is attached to the globe. At the lower end of stem E is a round aperture F to admit air to pass up through the stem E and tube D, and the air as it reaches the wick at top of tube D causes the light to burn with increased flame and brilliancy. The light can be put out or extinguished by pressing the thumb against the aperture F. The slots B are for the purpose of allowing the wick to be raised or lowered by a pin or wire.

The round apertures C are for the purpose of admitting the lard against the wick to keep the wick saturated.

The division in the cone is for the purpose of dividing the wick (two semicircular wicks forming a circle) so that when one side of the wick, becomes warmed, it assists in heating the other side, and the tube D becomes completely heated, and in case it becomes necessary to diminish the light, the wick of either side is picked down, and only one wick is left to burn.

The cone shaped feeder A A is formed by having the two sides of one of its segments bent inward so that the bent sides form the divisions in the cone, and the soldering is less, and the feeder more substantial and permanent than if the divisions were inserted between the tube and the cone.

I do not claim a tube or a feeder with apertures, but—

What I claim is—

A tube with a cone shaped feeder and lard heater in two segments (to admit of a double wick) with its apertures and the aperture F in the stem E all in combination, substantially as described and for the purposes herein set forth.

SAMUEL DAVIS.

Witnesses:
   I. FRANKLIN REIGART,
   M. CARPENTER.